US012578308B2

(12) United States Patent
Bishop et al.

(10) Patent No.: US 12,578,308 B2
(45) Date of Patent: Mar. 17, 2026

(54) METHOD AND APPARATUS FOR DETECTING AN INITIAL LUBRICATION OF A MOVING COMPONENT

(71) Applicant: U.E. Systems, Inc., Elmsford, NY (US)

(72) Inventors: William Bishop, Pleasantville, NY (US); Gary Mohr, Cortlandt Manor, NY (US); Blair Fraser, Cambridge (CA)

(73) Assignee: U.E. Systems, Inc., Elmsford, NY (US)

( * ) Notice: Subject to any disclaimer, the term of this patent is extended or adjusted under 35 U.S.C. 154(b) by 338 days.

(21) Appl. No.: 17/944,419

(22) Filed: Sep. 14, 2022

(65) Prior Publication Data

US 2023/0003690 A1 Jan. 5, 2023

Related U.S. Application Data

(63) Continuation-in-part of application No. 17/530,249, filed on Nov. 18, 2021, now Pat. No. 11,733,125, (Continued)

(51) Int. Cl.
*G01N 29/032* (2006.01)
*F16N 29/00* (2006.01)
(Continued)

(52) U.S. Cl.
CPC ........... *G01N 29/032* (2013.01); *F16N 29/00* (2013.01); *G01M 13/045* (2013.01);
(Continued)

(58) Field of Classification Search
None
See application file for complete search history.

(56) References Cited

U.S. PATENT DOCUMENTS

| | | | | |
|---|---|---|---|---|
| 4,441,369 A | * | 4/1984 | Lessard | G01N 29/11 |
| | | | | 73/620 |
| 4,592,034 A | * | 5/1986 | Sachse | G01S 5/28 |
| | | | | 367/129 |

(Continued)

FOREIGN PATENT DOCUMENTS

| | | | | |
|---|---|---|---|---|
| EP | 2558767 B1 | * | 11/2020 | G01B 17/00 |
| GB | 2358470 A | | 7/2001 | |

(Continued)

OTHER PUBLICATIONS

International Search Report and Written Opinion in corresponding International Application No. PCT/US2021/064781, mailed Mar. 29, 2022.

(Continued)

*Primary Examiner* — Huy Q Phan
*Assistant Examiner* — Carl F. R. Tchatchouang
(74) *Attorney, Agent, or Firm* — LEASON ELLIS LLP

(57) ABSTRACT

An apparatus and method for detecting an initial lubrication of a moving component including an ultrasonic sensor for detecting an ultrasonic output signal from the moving component and a processor for operating on the output signal. The processor determines if there has been an initiation of a lubrication operation. After identifying the initiation of the lubrication operation, the processor monitors the ultrasonic output signal received from the ultrasonic sensor to detect a momentary increase in the amplitude of the ultrasonic output signal above a level that indicates a need for lubrication, and which is indicative of an initial interaction between a lubricant and the moving component. Upon detecting the momentary increase in the amplitude, the processor tracks a progress of the lubrication operation by detecting for a sustained decrease in the amplitude of the ultrasonic output signal received from the ultrasonic sensor.

16 Claims, 7 Drawing Sheets

Related U.S. Application Data which is a continuation-in-part of application No. 17/131,523, filed on Dec. 22, 2020, now Pat. No. 12,007,360.

(51) Int. Cl.

| | |
|---|---|
| *G01M 13/045* | (2019.01) |
| *G01N 29/44* | (2006.01) |
| *G01N 29/46* | (2006.01) |

(52) U.S. Cl.
CPC ..... *G01N 29/4427* (2013.01); *G01N 29/4454* (2013.01); *G01N 29/46* (2013.01); *G01N 2291/2696* (2013.01)

(56) References Cited

U.S. PATENT DOCUMENTS

| | | | |
|---|---|---|---|
| 4,785,659 | A | 11/1988 | Rose et al. |
| RE33,977 | E | 6/1992 | Goodman et al. |
| 6,101,427 | A | 8/2000 | Yang |
| 6,116,080 | A * | 9/2000 | Logue .................... G01N 29/50 |
| | | | 73/24.05 |
| 6,122,966 | A | 9/2000 | Goodman et al. |
| 6,339,961 | B1 | 1/2002 | Goodman et al. |
| 6,996,030 | B2 | 2/2006 | Goodman et al. |
| 7,134,323 | B1 * | 11/2006 | Discenzo ........... G01N 33/2888 |
| | | | 702/183 |
| 8,707,785 | B2 | 4/2014 | Goodman et al. |
| 8,745,768 | B1 | 6/2014 | Moghaddas |
| 8,746,068 | B2 | 6/2014 | Goodman et al. |
| 9,200,979 | B2 | 12/2015 | Goodman et al. |
| 2003/0062380 | A1 | 4/2003 | Boyle et al. |
| 2004/0250623 | A1 * | 12/2004 | Walker .................. F16C 33/102 |
| | | | 73/593 |
| 2005/0125170 | A1 * | 6/2005 | Gysling ............... G01N 29/222 |
| | | | 702/48 |
| 2010/0147627 | A1 * | 6/2010 | Lakomiak .............. G01H 1/003 |
| | | | 184/7.4 |

| | | | |
|---|---|---|---|
| 2012/0132304 | A1 | 5/2012 | Conley et al. |
| 2012/0316796 | A1 | 12/2012 | Bishop et al. |
| 2017/0215841 | A1 | 8/2017 | Pandey |
| 2018/0156757 | A1 * | 6/2018 | Nagrodsky ............ G01N 29/12 |
| 2020/0296513 | A1 | 9/2020 | Littrell |
| 2022/0196141 | A1 | 6/2022 | Bishop et al. |
| 2022/0196518 | A1 | 6/2022 | Bishop et al. |

FOREIGN PATENT DOCUMENTS

| | | |
|---|---|---|
| JP | H02218353 H | 8/1990 |
| JP | H02218363 A | 8/1990 |

OTHER PUBLICATIONS

International Preliminary Report on Patentability in corresponding International Application No. PCT/US2021/064781, mailed Jul. 6, 2023.

Examination Report in corresponding European Application No. 22207429.6, dated Apr. 8, 2024.

Extended European Search Report in corresponding European Application No. EP 22207429.6, issued Apr. 18, 2023.

Bhattaru Purnendu et al: "A 36dB Gain Range, 0.5dB Gain Step Variable Gain Third-Order Filter for Portable Ultrasound Systems", 2020 33rd International Conference on VLSI Design And 2020 19th International Conference on Embedded Systems (VLSID), IEEE, Jan. 4, 2020 (Jan. 4, 2020), pp. 96-100.

International Search Report and Written Opinion in corresponding International Application No. PCT/US2023/073789, mailed Feb. 21, 2024.

Examination Report in corresponding Great Britain Application No. GB2305621.1, dated Jan. 10, 2025, 1 page.

Notice of Allowance in Great Britain Application No. GB2305621.1, dated Feb. 7, 2025, 1 page.

Examination Report in corresponding Great Britain Application No. GB2305621.1, dated Oct. 29, 2024. [5 pages].

* cited by examiner

LUBRICATION DISPENSER 25

CONTROL UNIT  60

SENSOR  20

85

87

STORAGE
62

22

64  LINE

66  CONTROL VALVE

68  GREASE FITTING ADAPTOR

65

11

MOTOR  10

18

15  BEARING HOUSING

Initial Lubrication Detection Flow Chart

METHOD AND APPARATUS FOR DETECTING AN INITIAL LUBRICATION OF A MOVING COMPONENT

CROSS REFERENCE TO RELATED APPLICATIONS

This application is a continuation-in-part of U.S. patent application Ser. No. 17/530,249 filed Nov. 18, 2021, and entitled Auto-Adjusting Analog Ultrasonic Sensor, which is a continuation-in-part of U.S. patent application Ser. No. 17/131,523 filed Dec. 22, 2020, and entitled Globally-Based Automatic Lubrication System, the contents of each of which are incorporated herein by reference in their entirety.

FIELD OF THE INVENTION

The present invention relates generally to the receipt of ultrasonic signals as a means for detecting mechanical faults and, more particularly, to an ultrasonic detection system that automatically adjusts its dynamic range in response to the amplitude of the received ultrasonic signal and indicates the initial start of lubrication of a moving component.

BACKGROUND OF THE INVENTION

Ultrasonic sensors have been used to detect ultrasonic energy generated by friction within mechanical devices, such as that created by deteriorated bearings, as disclosed in U.S. Pat. No. Re. 33,977 to Goodman, et al., the contents of which are hereby incorporated herein by reference in its entirety. The greater the amount of friction, the greater is the intensity of the generated ultrasonic energy. Applying a lubricant to the device reduces friction and consequently the intensity of the generated ultrasound drops. Measuring ultrasonic energy thus provides a way to determine when lubrication has reached the friction generating surfaces. Additionally, faulty devices, such as bearings, generate a higher level of ultrasonic energy than do good bearings and thus, this condition can also be detected.

Not only can under-lubrication quickly lead to bearing damage from increased friction, over lubrication can also be a problem. Over-lubrication can increase heat, damage bearing seals, and/or contaminate motor windings.

As indicated in U.S. Pat. No. 6,996,030 of Goodman et al. (which is incorporated herein by reference in its entirety) ultrasonic transducers generally produce a low voltage output in response to received ultrasonic energy. Thus, it is necessary to amplify the detected signal using a high-gain preamplifier before it can be accurately processed. However, if low cost heterodyning and display circuitry are to be used, means must be made available to attenuate the amplified signal to prevent saturating these circuits when high input signals are present. This attenuation also adjusts the sensitivity of the device. In such devices in the prior art the degree of attenuation is manually selectable by the user. For example, U.S. Pat. No. 4,785,659 to Rose et al. discloses an ultrasonic leak detector with a variable resistor attenuator used to adjust the output level of an LED bar graph display. U.S. Pat. No. 6,996,030 of Goodman (Goodman '030) has an amplifier controlled sensitivity setting such that the overall sensitivity of the system is determined by a micro-controller, whereby an operator using a dial on a front panel of the instrument can adjust the overall sensitivity. As a result, if the sensitivity of the system is lowered by a predetermined level, a clipped (saturated) signal output from the amplifier is toggled such that gain switching occurs at the transducer pre-amp and at a variable gain amplifier.

The Goodman '030 patent discloses a sensitivity encoder 100 that is used to increase or decrease the sensitivity level of a dual heterodyne circuit. The sensitivity is adjusted by turning a rotational knob that is located at the back of the housing. In preferred embodiments, the sensitivity encoder is a rotational optical encoder, whose rotation changes the output level of the control voltage that controls the gain of the amplifier so as to produce proportional changes in the sensitivity level of the dual heterodyne circuit.

U.S. Pat. No. 8,745,768 of Goodman and U.S. Pat. No. 9,200,979 of Goodman (which are incorporated herein by reference in their entirety) disclose a front end CPU that is a sub-processor that carriers out detailed instructions from a main CPU to set the sensitivity and frequency in response to operator selection at a touch screen as interpreted by the main CPU.

As indicated in the grandparent application of this application, i.e., Ser. No. 17/131,523, when the ultrasonic signal from a sensor is provided to an analog front end circuit, it can be buffered and conditioned. This front end circuit can also have a dynamic range adjustment to set its gain based on the amplitude of the base ultrasonic signal, so the control unit does not have to be modified for the ultrasonic signal level of different bearings. The prior art manually adjustable sensitivity range was typically 0-40 dB.

An auto-adjusting analog ultrasonic sensor system that accomplishes this gain adjustment function without manual intervention is disclosed in the parent of this application, i.e., Ser. No. 17/530,249. That sensor system can in part be remote, so that it can be used where manual adjustment of its sensitivity in view of changing circumstances (a sudden large ultrasonic signal) is not practical.

In large facilities it is difficult to have personnel travel from bearing location to bearing location checking the state of the bearing by measuring its ultrasound, and applying grease where required. To solve this problem automated grease systems as described in the parent application have been implemented. In such systems ultrasonic detectors are associated with each bearing and the signal from those detectors are remotely monitored. Also, grease supplies are distributed throughout the facility and are typically connected to several bearings. Based on the remotely sensed ultrasonic signals, controls are operated to automatically dispense the proper amount of grease to each bearing. The problem with automated grease systems is that there is no easy way to confirm that grease is being dispensed from the automatic lubricator and entering the bearing. Some installations can have 20 feet of remote grease lines that the automatic lubricator has to push the grease through to reach the bearing.

SUMMARY OF THE INVENTION

The present invention is an ultrasonic sensor system combined with a lubrication dispenser than can automatically lubricate bearings located at distances from each other. The system includes an automatic sensitivity adjustment. It can operate continuously unattended. The sensor system has an enhanced dynamic range, essentially making it more sensitive and thus useable for difficult applications that could only be addressed with handheld devices where the user is available to manually adjust the sensitivity, as opposed to situations where the user is remote. Along with the extra sensitivity, this sensor of the present invention is able to control the attenuation or simply turn it down when needed.

A bearing lubrication situation can be complicated where a lower power consumption is needed, e.g., where it depends on battery operated devices. This lower power consumption also lowers the dynamic range at any single setting. The prior art handheld devices had a couple of methods to adjust the sensitivity, but they required user intervention. The present invention is a sensor system that self-adjusts its own sensitivity with no intervention from the user. This is a huge benefit when applied to the field of remote sensing, including bearing fault detection, valve leakage and steam trap issues.

The auto-sensitivity adjustment feature enables users to automatically tune into bearing sound and clearly identify lubrication and health issues at speeds as low as 1 RPM and to trap sound so as to clearly identify leaking or blowing traps and valves. The automatic sensitivity adjustment is from 0 dB to 100 dB, and may be extendable to 120 dB.

The auto-sensitive sensor passively senses ultrasounds produced by mechanical equipment in the form of friction, impacting and turbulence, and processes the level of decibels into a signal that works seamlessly with existing PLC's, SCADA, DCS and other automation systems. This, in turn, supports real-time data trending and alerting, making it possible to detect and address important issues earlier and faster. The sensor system also employs Edge Analytics—allowing for in-device data processing, less reliance on cloud computing, and the ability to act on information in real-time.

In an exemplary embodiment the ultrasound system uses an ultrasonic transducer to pick up an ultrasound signal from bearing under examination. This ultrasound signal is conditioned by an analog front end variable gain amplifier. The output of the analog front end ultrasonic signal is fed to the input of heterodyne circuitry and is sampled at a predetermined sample rate by a processor's analog-to-digital converter. The processor generates a configurable carrier signal that is user selectable for the heterodyne circuit's mixer with a frequency range of about 20 kHz to 100 kHz. The samples of the digital version of the ultrasound signal and the carrier are multiplied together in the mixer. The result is digitally filter so as to reject all frequencies except for the audio frequency spectrum with a range between 0 Hz and approximately 5 kHz The processor monitors the digitized amplitude level of both the ultrasound and the audio and automatically adjusts the sensitivity (the gain) of the analog front end preamplifier if the digitized amplitude level is out of range. This is called "auto sensitivity adjustment."

An auto sensitivity adjustment algorithm determines whether the signal is saturating, or above the threshold, which can keep it from making accurate decibel calculations. The processor calculates a lower sensitivity setting to bring the ultrasonic signal to within an acceptable working range. Conversely, if the ultrasonic signal is determined to be too low to make an accurate decibel calculation, the auto sensitivity algorithm calculates a higher sensitivity setting to bring the ultrasonic signal to within an acceptable working range. When the ultrasound and/or the audio is in an acceptable working range, the processor will calculate the ultrasound amplitude dB value and the audio amplitude dB value.

In addition to calculating sensitivity, the processor may perform fast Fourier transfer (FFT) calculations and/or execute other digital signal processing algorithms. The processor provides dB and data outputs by means of digital-to-analog converters and communication ports and protocols.

The sensor system techniques include generation of a configurable carrier signal, performing digital amplitude modulation with the configurable carrier frequency and the digitizing of the amplitude of the ultrasound, and extracting the digital heterodyned audio spectrum digital audio produced by the digital AM modulation. The processor also has the ability perform FFT, or use other analysis algorithms on the ultrasound and/or the heterodyned ultrasound audio signal.

The sensor system provides enhanced signal processing capabilities for the detected ultrasound or heterodyned ultrasound signals, such as spurious glitch detection and/or filtering, fast or slow peak detection, and other advanced pattern recognition capabilities that allow for the detection, processing, and/or reporting of specific events. In addition, the ability of the system to self-adjust its range typically gives the device a 100 dB range, and may even have up to a 120 dB range. Many times the input ultrasound signal would fluctuate outside of the typical 40 dB range of the prior art. This made it difficult for the operator to try to manually set the sensor system in the correct range. This difficulty is eliminated by the present invention.

The analog output signal is a continuous linear analog output, across the full range of sensitivity, proportional to the dB (decibel) value of the ultrasound and/or the heterodyned ultrasound audio signal amplitudes. The system can provide FFT data, and temperature measurements, heterodyned audio, and digital signal processing data outputs.

Additionally, while an increase in the detected dB level (or amplitude) from a moving component, e.g. a bearing, is typically used as an indication of a need for lubrication or an indication of an over-lubrication, it has been found that a momentary increase in the elevated detected dB level of a bearing needing lubrication is a reliable indicator that an initial amount of lubricant has started to enter the moving part upon application of the lubricant.

A grease supply, either from a grease gun or from a smart lube dispensing apparatus, is often not directly connected to the lubrication entrance of a bearing. As an example, there can be a grease tube that connects the grease supply to the bearing that extends over many feet, e.g., up to 20 feet in some applications.

Therefore, when the bearing is calling for grease and the grease is added from the remote supply, the connecting tube and/or a chamber between the grease fitting and the actual entrance to the bearing is often filled with the applied grease before any grease enters the bearing. Additionally, dependent upon the type of lubricant and moving component, the lubricant (e.g., grease) can melt out of the tubes slowly and the tubes could become a temporary reservoir that needs to be refilled before any grease interacts with the bearing, It is recognized that the exact time when the grease enters the bearing (in other words, when an applied lubricant initially interacts with a moving component) is very helpful. As one example, the detection of such an initial interaction confirms that an applied lubricant has, indeed, reached the moving component. If grease is applied from a supply to the bearings of a motor over a significant time and the ultrasound does not diminish, it could mean that the grease is not reaching the bearing or the bearing seal has ruptured. When the bearing seal has ruptured, grease just passes through the seal and does not accumulate in the bearing. This lack of response to the application of grease can also exist for a variety of other reasons—as one example, the tube from the grease reservoir to the bearing may have also ruptured.

In view of the above, the present invention provides a process and an apparatus for detecting the need for lubrication by moving components, the application of that lubrication and the detection of the initial interaction between an applied lubricant and its target moving component, thereby confirming effective lubrication has begun.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

Figure 1:
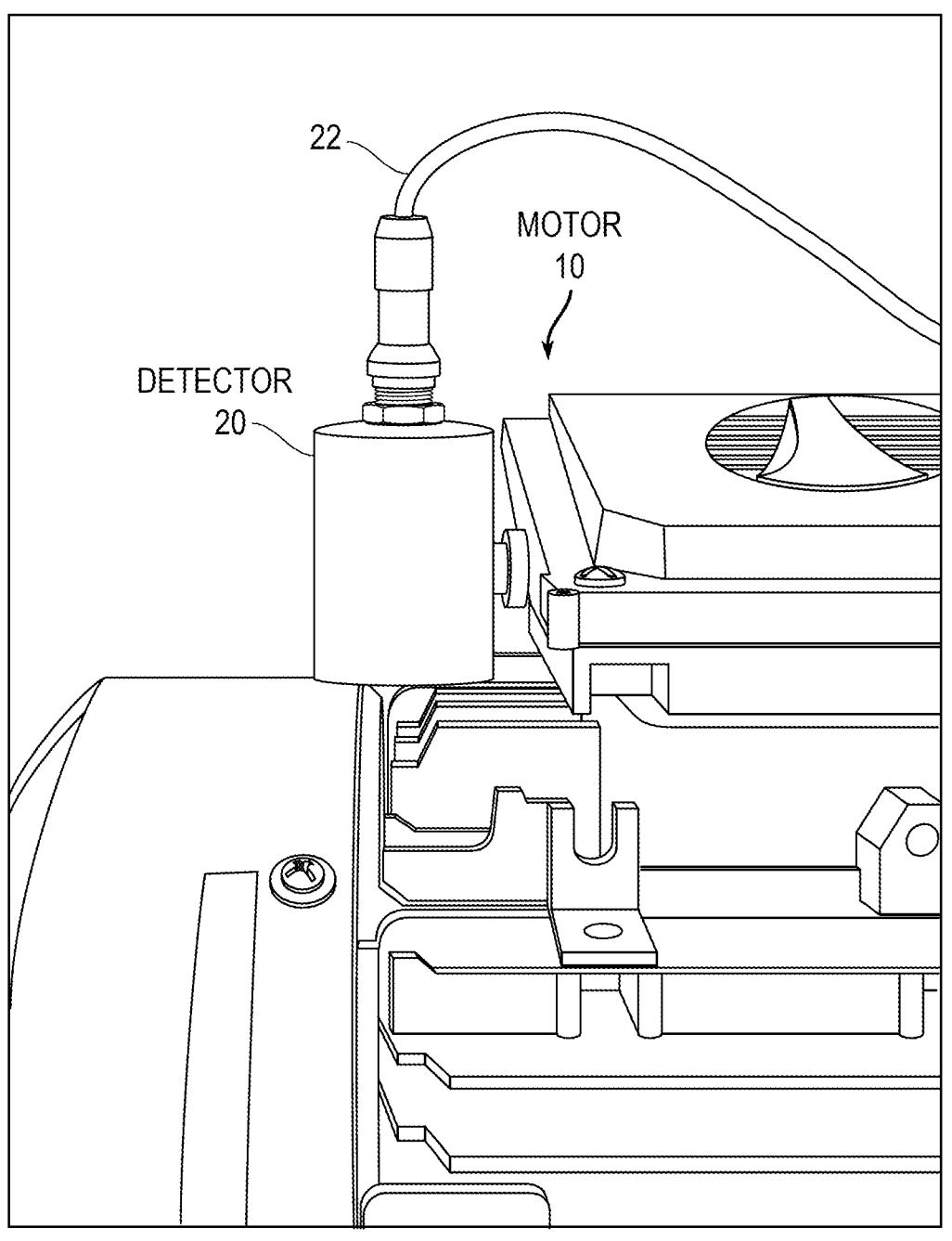
FIG. 1 is an image of the auto-adjusting analog ultrasonic sensor of the present invention mounted on a motor having bearings that are being checked.

In one embodiment of the present invention there are organizations responsible for maintenance at large factories spread out over acres of land. Such factories frequently contain numerous motors, each having at least one set of bearings. FIG. 1 shows a portion of one such motor 10. An ultrasonic sensor or detector 20 is located on the housing 15 of the motor 10 in which the bearings are located by means of a solid sensor mounting stud. These detectors are contact sensors, and each provides an ultrasonic signal with information about the status of the associated bearing. The bearing information is passed through wires in cable 22 to a local controller. Based on the level of ultrasound detected by the sensor above normal levels, the local controller causes lubricant to be automatically injected through the lubrication tube (not shown) into the bearings grease fitting (not shown) until the ultrasound level returns to normal. A typical single point lubricator may contain, e.g., 250 cc of lubricant. A microprocessor-controlled, energy efficient motor in the local controller can be used to drive a pump or piston to deliver lubricant (e.g., grease) to the bearings with precision.

Figure 2:
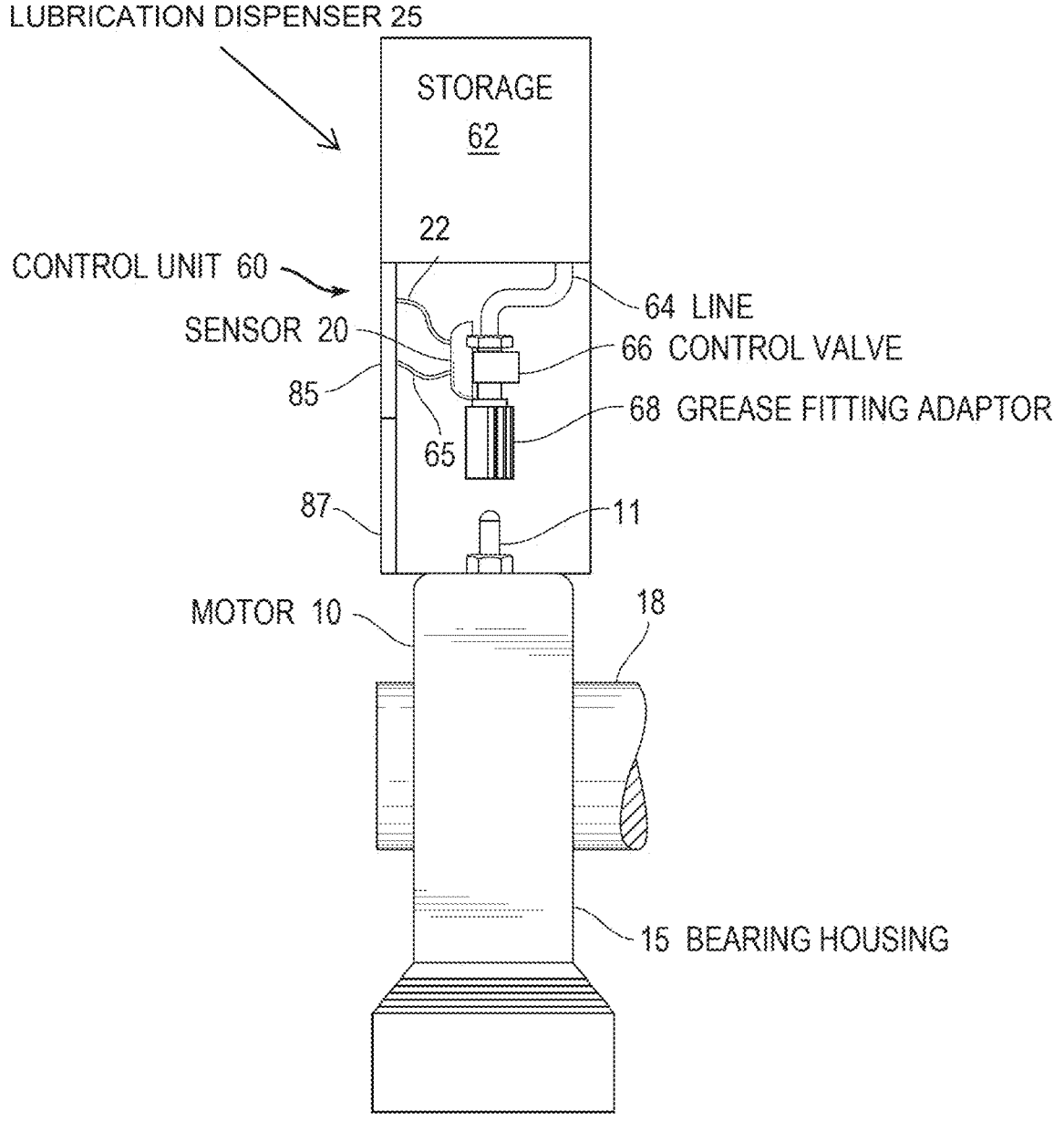
FIG. 2 is a diagram of the ultrasonic system of the present invention mounted on a motor.

As shown in FIG. 2, a bearing in bearing housing 15 supports a shaft 18. The rotation of the shaft by a motor (not shown) creates ultrasonic signals that change over time depending on the state of lubrication of the bearings (not shown). A lubrication control unit 60 is shown mounted on the bearing housing with one side removed so its internal mechanisms can be seen. The bearing housing 15 includes a grease fitting 11 through which lubricant from a storage container 62 can pass through a line 64 to the grease fitting 11. In a case where the lubricant is under pressure, a control valve 66 is provided in the line 64. In FIG. 2, the grease fitting adapter 68 is shown removed from the grease fitting 11, but in operation it makes a firm connection. The ultrasonic contact sensor 20 can be attached anywhere it can receive the ultrasonic signal of the bearings. In FIG. 2, it is shown attached to the adapter 68, but it could be mounted directly on the bearing housing 15, as shown in FIG. 1. Also, the lubrication line 64 can be permanently attached to the bearing housing 15, eliminating the need for the adapter 68. While in FIG. 2 a single control unit 60 with its lubrication storage reservoir 62 is shown associated with a single motor, controller 60 can be connected to multiple bearings on multiple motors and effectively supply the appropriate amount of lubrication to each.

In a preferred embodiment, the lubrication dispenser 25 is equipped with an electric motor (not shown) that drives a piston (not shown) when active so as to push grease into line 64. The motor can provide a smooth delivery of motion of the piston or it can be a stepper motor that moves the piston in small increments. In such a case, there may be no need for a valve (66). However, to ensure that grease does not leak into the bearing, the motor can be activated with a valve.

The ultrasonic signals picked up by sensor 20 are sent to a control circuit 85 over lines 22 in FIG. 2. The output of the control board 85 is connected to the operating input of valve or motor/valve combination 66 over line 65. In effect, the ultrasonic signal picked up by sensor 20 is applied to control circuit 85, which, based on an analysis by a computer or processor in local circuit 85, produces an output that opens and closes valve 66 while turning the lubricant motor on and off, so the correct amount of lubricant is injected into the bearings. After lubricant has been dispensed, the sensor continues to take readings and sends information to control circuit 85.

Circuit 85 has a power supply driven by the electrical power provided for the motor. However, in situations where the motor power may be intermittent, a backup battery 87 is also enclosed.

In accordance with an exemplary embodiment of the present invention, lubricant delivery initiations (e.g., a start signal issued by the local controller) are monitored for commencing an initial lubrication detection process that detects for the lubricant reaching and interacting with a moving part (e.g., bearings) after the lubricant has been dispensed.

Figure 3:
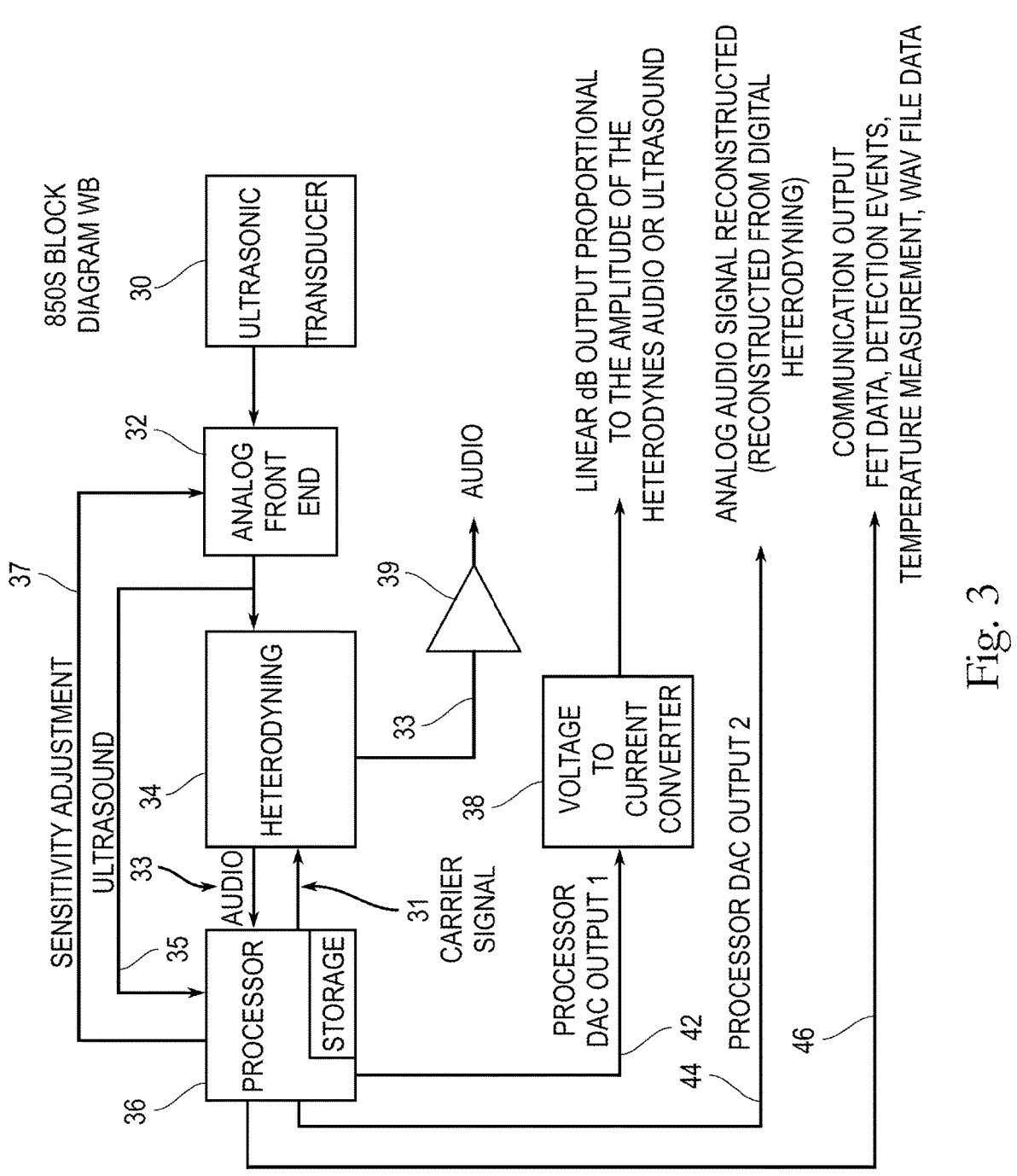
FIG. 3 is a block diagram of a digital ultrasonic friction detecting system of the present invention.

As shown in FIG. 3, the ultrasonic sensor 20 includes at least one transducer 30 that picks up an ultrasonic signal from the bearings and passes it to an analog front end variable gain amplifier 32, which converts it into an amplified ultrasonic voltage signal. The signal is mixed in a heterodyne circuit 34 with a carrier signal 31 from a processor 36, which carrier signal may have a frequency range of 20 kHz to 100 kHz, The heterodyne circuit 34 includes a low pass filter that extracts the audio spectrum signal 33 from the modulated signal's spectrum. The audio signal 33 is equivalent to the ultrasonic signal, but shifted in frequency to the audio range. The audio signal 33 is sent both to a separate analog-to-digital converter channel of the processor 36 and to an amplifier 39, where it is used elsewhere. Also, the ultrasound signal 35 is sent directly to the processor, which has the ability to digitally heterodyne the ultrasonic signal, if desired.

Where digital processing is preferred, the output of the analog front end 32 is fed to the input of heterodyne circuitry in the processor where it is sampled at a predetermined sample rate by an analog-to-digital converter. The processor generates a configurable digital carrier signal that is user selectable for the heterodyne circuit's mixer with a frequency range of about 20 kHz to 100 kHz. The samples of the digital version of the ultrasound signal and the carrier are multiplied together in the mixer. The result is digitally filter so as to reject all frequencies except for the audio frequency spectrum with a range between 0 Hz and approximately 5 kHz.

Use of this digital heterodyning can simplify and improve the heterodyning process by eliminating and replacing traditional analog heterodyning (mixing) circuitry with a digital heterodyning process. The benefits are a decrease in hardware component count, reduced PC Board size, and typically reduce power consumption. Further, there is an increase in the accuracy, stability, and repeatability of the user selectable carrier frequency. Typical analog carrier signal generators incorporate volage controlled oscillators whose frequency output can drift over time and temperature. In addition, carrier frequency calibration is eliminated. Analog circuits typically require factory calibration and periodic recalibration. This is eliminated by using a digital time base clock whose output is easily selectable, repeatable, stable and requires no calibration. There is also an increased accuracy in the dB measurements amplitude. The output signal amplitude of analog mixers used in the heterodyning process can also have variations due to temperature and carrier frequency drift. Because the analog mixing circuits are eliminated, the accuracy of the dB measurement is increased. Full scale dB calibration is also eliminated because there is no need for analog dB reference levels. This can be referred to as "Digital Heterodyning."

The processor 36 makes a determination about the amplitude of the audio signal based on the minimum signal the sensor can detect and generates a sensitivity adjustment signal 37 based on an "auto sensitivity adjustment algorithm." As shown in the flow chart of FIG. 3. The sensitivity adjustment signal 37 adjusts the gain of the analog front end amplifier 32 so the circuits after it are not saturated and/or have sufficient amplitude for an accurate measurement. The processor has storage, which stores data as well as the programs that control the processor to produce the sensitivity adjustment, the digital heterodyning and filtering and other information signals. This can be referred to as "Digital Amplitude Modulation."

A voltage to current converter 38 receives a DC voltage (DAC Output-1) 42 from processor 36 and produces a sensor system output that is a dB output linearly proportional to the amplitude of the heterodyne audio or ultrasound. In an exemplary embodiment the DAC Output-1 is converted to a linear current output with a range of approximately 0.50 mA to 16.30 mA. This range corresponds to a 0 dB to 100 dB change in amplitude of the ultrasound signal received directly from the analog front end 32 or the heterodyned audio. Wider ranges are available. The output signal can also be configured as a scaled output 0 to 25 mA current signal, or a 4 to 20 mA current loop.

As noted above, the sensor system has a feature that allows the processor to digitally heterodyne the ultrasound and digitally filter out the digital audio data. DAC Output-2 44 is the analog audio signal that is reconstructed from the digital audio data from the digital heterodyne process. This process is separate from the analog heterodyning process. There may be some nuances that one heterodyne process may pick up that the other may not. Therefore, both analog and digital heterodyning processes can be made available for maximum flexibility.

In addition to calculating sensitivity, the processor performs fast Fourier transfer (FFT) calculations and/or other digital signal processing algorithms. The processor has a communications output 46 that provides dB and data outputs by means of digital-to-analog converters, communication ports and protocols. The communication output may also provide temperature, and WAV file data for additional external analysis. According to an exemplary implementation of the present invention, processor 36 further incorporates one or more process steps to recognize an initial lubrication of a moving part—for example, a bearing mechanism—by detecting an increase in an elevated amplitude of audio signal 33 and/or ultrasound signal 35, which will be described in further detail below with reference to FIGS. 5 and 6.

Figure 4:
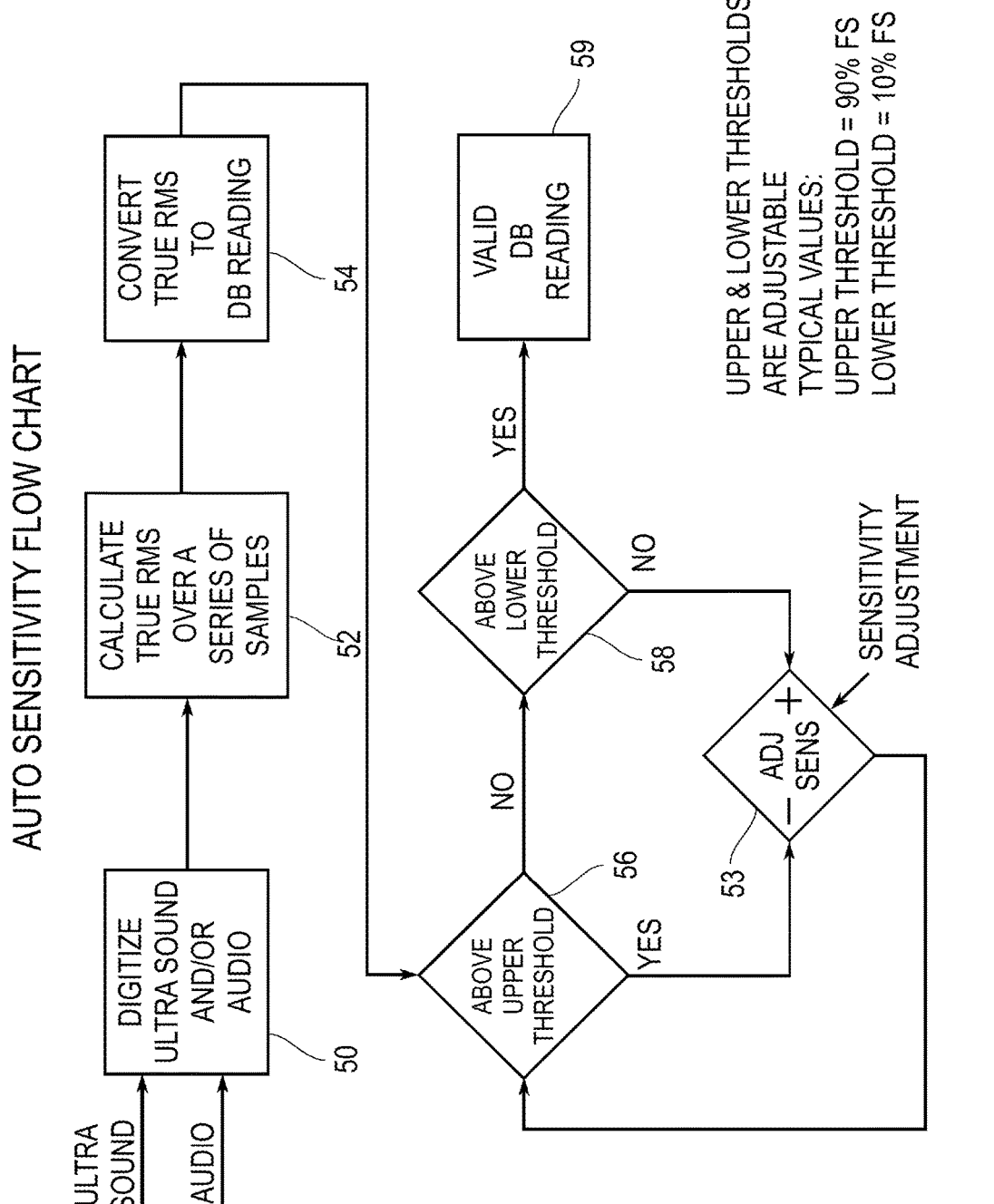
FIG. 4 is a flow chart of the auto sensitivity adjustment algorithm operation of the circuit of FIG. 2.

The auto sensitivity operation of processor 36 is shown in FIG. 4. At step 50, ultrasound and audio signals are digitized. Then at step 52 the true RMS values of the signals are calculated over a series of samples. Next at step 54 the true RMS values of the signals are converted to dB readings. A decision is made at step 56 as to whether the dB reading is above an upper threshold. If it is not, a determination is made at step 58 as to whether the dB signal is above the lower threshold. If the answer is yes, the reading is valid and is output at step 59 as a valid dB reading. This indicates that there is no need to change the sensitivity adjustment signal.

If at step 56 it is determined that the dB reading is above the upper threshold, the sensitivity signal is reduced by an increment at step 53 and the new value is tested again at step 56 to see if it is still above the upper threshold. Similarly, if in step 58 it is determined that the dB signal is not above the lower threshold, the sensitivity signal is increased by an increment in step 53 and the decisions about being above the upper threshold and below the lower threshold are repeated in steps 56 and 58 until there is no change, indicating that the gain has been adjusted to put the input signal in the operative range. The upper and lower thresholds are adjustable. Typically, the upper threshold is 90% of full scale and the lower threshold is 10% of full threshold. Also, the signal adjustment increments may be adjustable.

Thus, the auto sensitivity adjustment algorithm determines whether the signal is saturating, i.e., above the upper threshold, which can prevent the making of accurate decibel calculations. In such a case the auto sensitivity algorithm calculates a lower sensitivity setting (gain) to bring the ultrasonic signal to within an acceptable working range The processor also calculates a lower sensitivity threshold, which the signal must be above in order to bring the ultrasonic signal to within an acceptable working range. In such a case the auto sensitivity algorithm calculates a higher sensitivity setting to bring the ultrasonic signal up to within an acceptable working range.

The processor 36 monitors the digitized amplitude level of both the ultrasound and the audio and automatically adjusts the sensitivity (the gain) of the analog front end preamplifier 32 if the digitized amplitude level is out of range, i.e., "auto sensitivity adjustment is performed." When the ultrasound and/or the audio are in an acceptable working range the processor calculates the ultrasound amplitude dB value and the audio amplitude dB value.

As noted above, the sensor system has the ability to heterodyne the ultrasound that is fed into the processor's analog to digital converter directly using digital signal processing techniques. These techniques include generation of a configurable carrier signal, performing digital amplitude modulation with the configurable carrier frequency and the digitizing of the amplitude of the ultrasound, and extracting the digital heterodyned audio spectrum "digital audio" produced by the digital AM modulation using low pass digital filtering algorithms.

The sensor system provides enhanced signal processing capabilities of the detected ultrasound or heterodyned ultrasound signal, such as spurious glitch detection and/or filtering, fast or slow peak detection, and other advanced pattern recognition capabilities that allow for the detection, processing, and/or reporting of specific events.

The auto-sensitivity adjustment feature enables users to automatically adjust the sensitivity in a range from 0 dB to 100 dB, and may be 0 dB to 120 dB, as opposed to the 40 dB adjustable window of the prior art.

Figure 5:
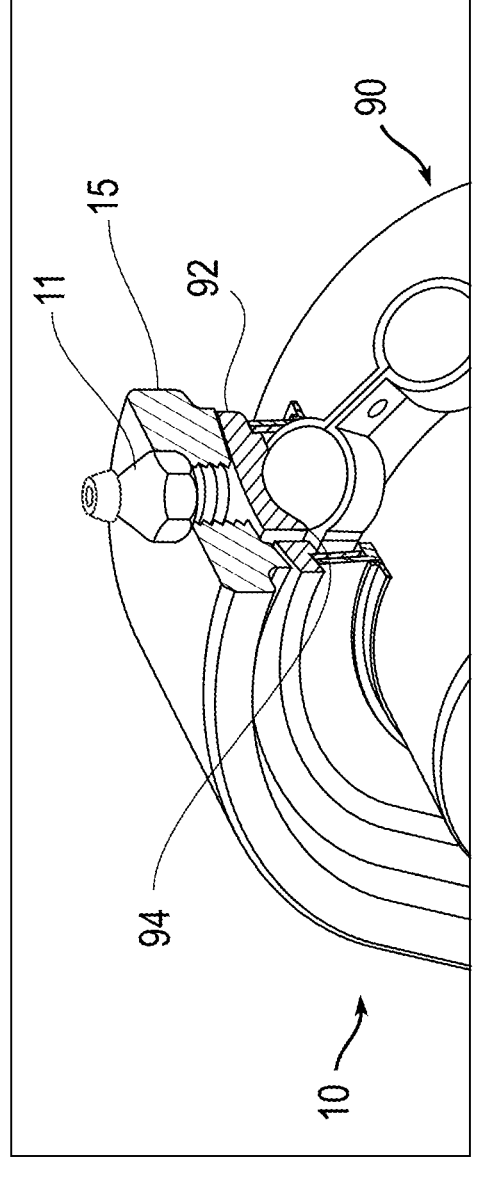
FIG. 5 is a schematic drawing of a grease injection port on a motor with bearings for illustrating the initial lubrication detection features of the present invention.

As noted before, numerous motors, each having at least one set of bearings, can be spread across large facilities. Each of these motors would require periodic lubrication, which can be undertaken by operators using handheld devices and/or automated systems with direct connections to lubricant supplies, via tubing and the like. FIG. 5 shows a portion of one such motor 10 with a partial section.

As illustrated in FIG. 5, motor 10 includes a grease fitting 11 that is in fluid communication with an interior chamber 90 for bearings through an internal channel (not shown) that extends through a housing 15 and a spherical outer ring 92. According to one embodiment, the internal channel (not shown) includes a grease dripping hole 94 for directing the injected grease to interior chamber 90—for example, by directing the injected grease for lubrication coverage on the bearings. According to one example embodiment, tubing (not shown) is connected to grease fitting 11 and grease is injected into the fitting 11 when lubrication is required. In some embodiments, the tubing (not shown) can be temporarily connected to a handheld grease gun during service by an operator or permanently connected to an automated maintenance system, which includes a lubrication mechanism for supplying grease to motor 10 as shown in FIG. 2.

Thus, lubricant (e.g., grease) that is injected via fitting 11 does not immediately reach its intended lubrication target, the bearings in the interior chamber 90. Furthermore, in facilities with motors that are disposed at distant locations, tubing (and/or piping) to respective grease fittings 11 can cover substantial distances. Consequently, any lubricant that is applied from a supply 62 to a particular motor 10 in a facility may require significant travel distance and time before reaching the particular motor 10, let alone the interior chamber 90 for the bearings that require the lubrication.

Figure 6:
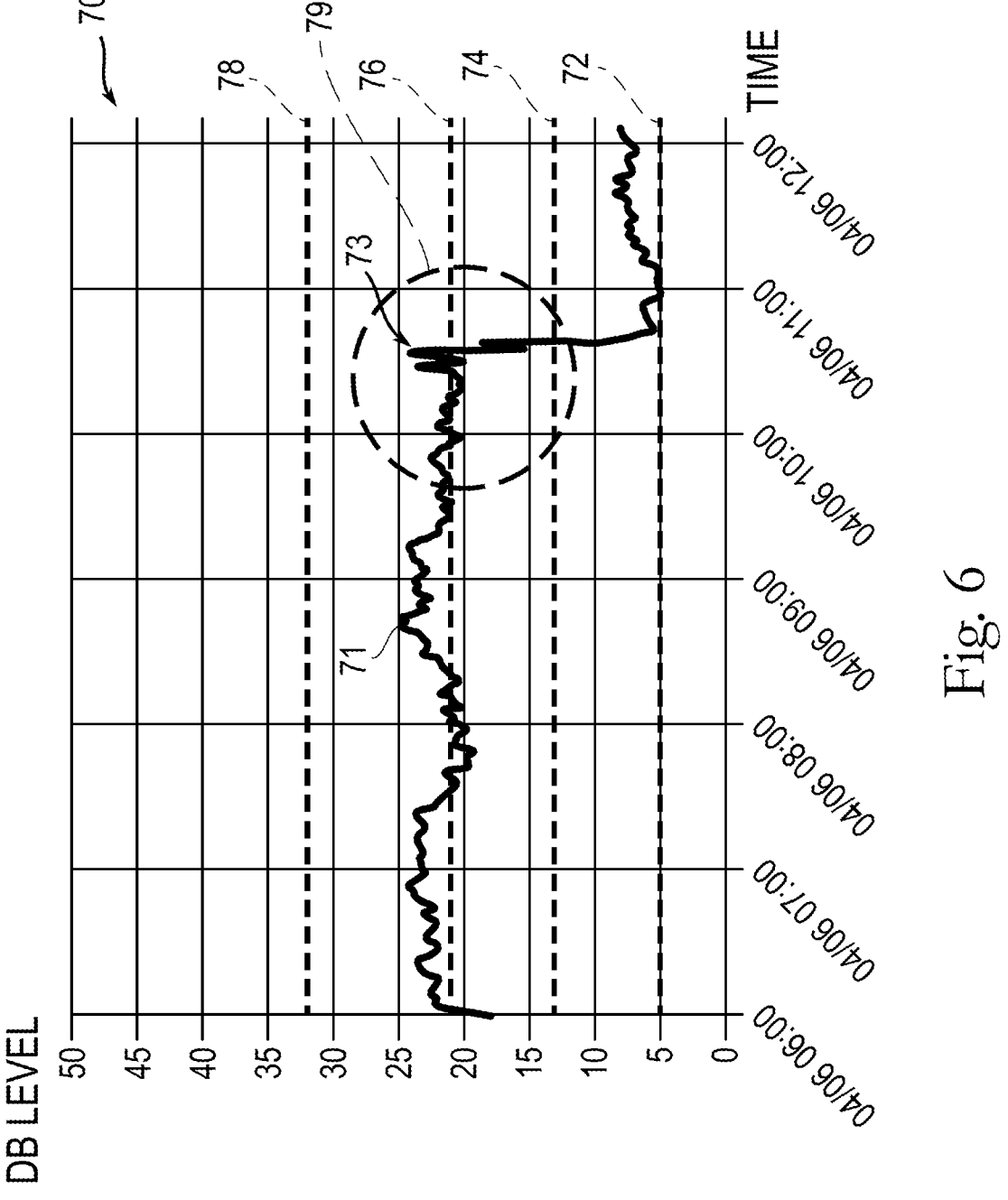
FIG. 6 is a graph illustrating a momentary further increase in an elevated detected dB level of a bearing needing lubrication reflecting an injected lubricant initially reaching and interacting with the monitored moving component.

FIG. 6 is a detected ultrasonic signal dB level vs. time graph plot 70 of a dB reading 71 of an ultrasonic sensor on a moving component that shows a momentary increase 73 in the elevated dB level of a bearing that needs lubrication as the lubricant initially enters the interior chamber 90 and interacts with the bearings within. As illustrated in FIG. 6, the dB level tracking includes: a 5 dB optimal operating level 72, a 13 dB first threshold 74, a 21 dB second threshold 76, and a 32 dB third threshold 78. According to one exemplary embodiment, the first threshold 74 is an operating baseline of acceptable dB output and the second threshold 76 determines a need for lubrication (e.g., grease application). In certain embodiments, different thresholds and different numbers of thresholds can be applied based on the moving component being monitored.

As illustrated in FIG. 6, a momentary increase (or spike) 73 in the dB level is recorded in the period 79 just before the dB level decreases from near the second threshold 76 over a period of time to near the optimal operating level 72. The reduced dB level after the increase 73 reflects the desired effect of the lubrication. Increase 73 itself reflects a momentary increase in friction as lubricant initially interacts with a moving component (e.g., bearings in motor 10) and pushes against them. As shown in FIG. 6, the increase in amplitude 73 is only about 3 dB, but it is immediate. In certain embodiments, the amplitude increase 73 can be different based on the application, bearing type, and operations. As further illustrated in FIG. 6, the momentary increase 73 lasts a very short time (e.g., less than 2 seconds) and is followed by a substantial decrease in the sustained dB level detected from the moving component, thus confirming that grease has been pushed into the bearings. In embodiments at large facilities with automated maintenance systems, plot 70 confirms that there is not a breach in the connection between the grease supply 62 and motor 10, and also may indicate that the bearing seal has not ruptured.

However, if there is not a detected momentary increase in friction, there may be a blockage in the grease path, the grease line may be disconnected, and/or the volume of grease added is not enough to cause an increase in ultrasound (did not cause an increase in friction from the rolling elements distributing the grease throughout the bearings). Accordingly, in an exemplary implementation, a process and an apparatus for detecting this momentary increase in friction are provided to ensure that lubricant has reached an intended moving component target and, if not, to generate an alert for maintenance service for the lubrication mechanism.

Figure 7:
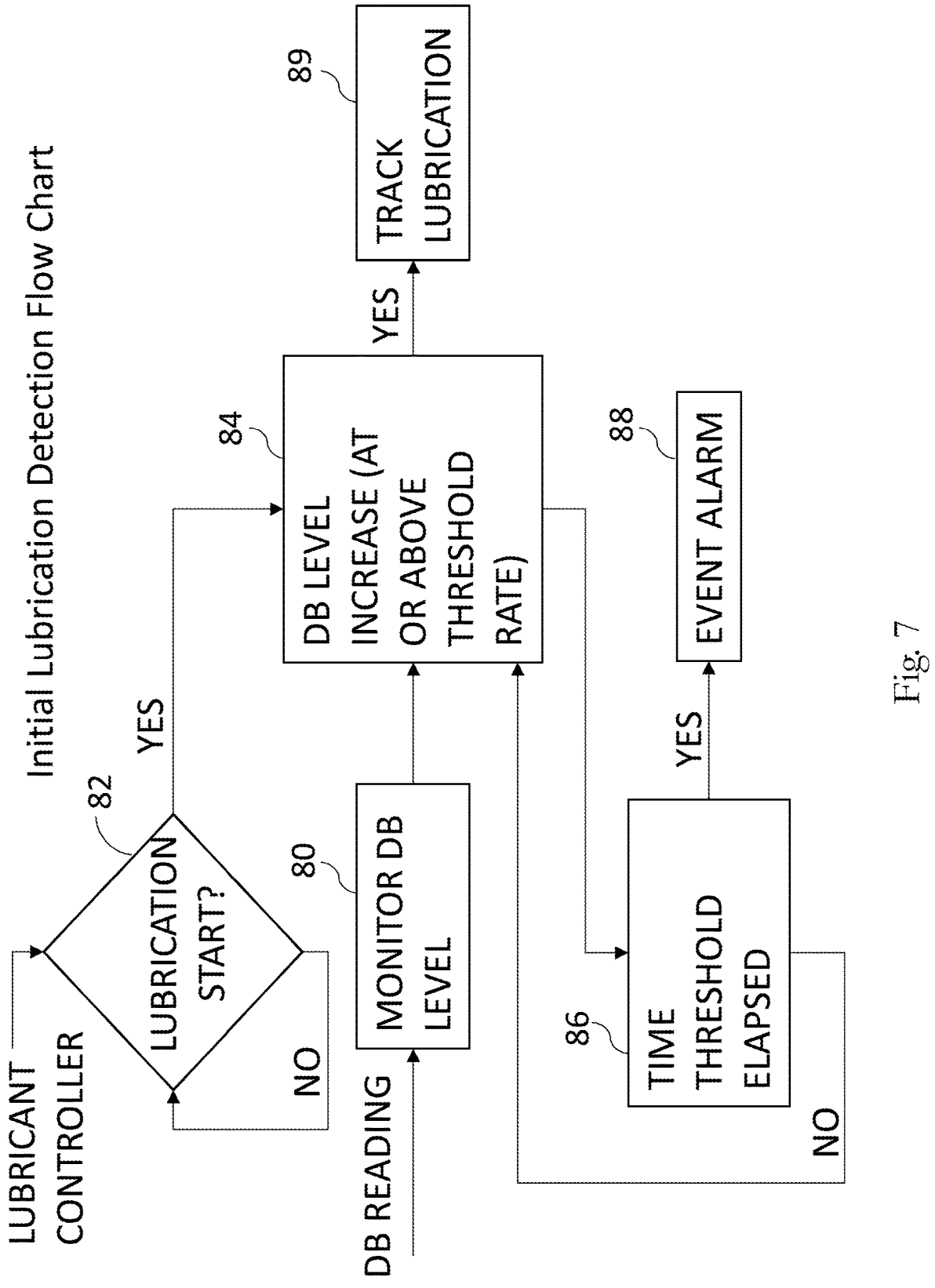
FIG. 7 is a flow chart of the initial lubrication detection operation according to an example implementation of the present invention.

FIG. 7 is a flow chart of the initial lubrication detection operation according to an exemplary implementation of the present invention. In one such embodiment, the initial lubrication detection operation is conducted by processor 36 (FIG. 3). In alternative embodiments, at least a portion of the operation can be executed by a dedicated controller (not shown). In one example, the dedicated controller can be a lubricant dispensing controller.

At step 80, a dB reading detected from a moving component (e.g., motor 10) is determined and monitored over time (e.g., plot 70 of FIG. 5). In one exemplary embodiment, the dB reading monitored at step 80 is the valid output of step 59 (FIG. 4). In alternative embodiments, the dB reading can be the output of any ultrasonic sensor system used to monitor or detect the dB output of a moving component.

Next at step 82, a determination is made as to whether a lubrication operation has been initiated ("LUBRICATION START?"). According to an exemplary embodiment, processor 36 is communicatively connected to a lubricant controller (not shown) and determines whether the lubricant controller has issued a signal or command for dispensing a lubricant to the moving component (e.g., motor 10). In certain embodiments, a lubricant controller in an automated lubrication mechanism that can make the determination of whether it has issued such a signal or command in response to a sustained elevated dB level detected at step 80 (e.g., at or above second threshold 76 in FIG. 6). In some embodiments, an operator can input an indication that lubricant has been applied (e.g., using a handheld grease gun) via a user interface (not shown), which is identified at step 82 as an initiation of a lubrication operation. If no lubrication operation has been initiated (e.g., no lubrication start signal has been issued or detected) ("NO"), step 82 is repeated until a lubrication initiation is identified at step 82.

If a lubrication initiation is identified at step 82 (e.g., a lubrication start signal has been issued or detected) ("YES"), the operation proceeds to step 84, where a determination is made on whether a momentary increase (e.g., at or above a threshold rate of increase) has occurred for the monitored dB level. Referring back to FIG. 6, one exemplary threshold rate is about 3 dB over 2 seconds, or about 1.5 dB per second.

If a momentary increase (or spike) has not occurred ("NO"), a determination is made at step 86 as to whether a time threshold has elapsed from the time the lubrication start signal was issued. The time threshold is dependent upon, inter alia, the size of the moving component (bearing), type of lubricant (grease), the distance between the lubrication supply and the target moving component, the size (or diameter) of the channel (or tubing) between the lubrication supply and the target moving component, and the pump/travel speed of the lubricant. For a direct connection (e.g., handheld grease gun by an operator), the time threshold is within 1-2 seconds according to one embodiment of the present invention. In some embodiments, the time threshold can be adjusted according to one or more of a model, a size, or a structural arrangement of the moving component, structural characteristics of the internal lubricant feed channel of the moving component, to name a few, as well understood by one of ordinary skill in the art. In some embodiments, the time threshold is increased to approximately 5 minutes depending upon the size and speed of a moving component (e.g., motor 10) and/or the length of tubing between a lubricant source (e.g., grease supply 62) and the moving component (e.g., motor 10). In certain embodiments, the time threshold can be pre-set or entered via a user interface (not shown) based on determined characteristics of the lubrication mechanism (e.g., measured length of ad hoc tubing).

If the time threshold has not elapsed ("NO"), the operation returns to step 84 to continue detecting for the momentary increase. If, however, the time threshold has elapsed ("YES"), the operation proceeds to step 88 where an event alarm is generated so that the lubrication mechanism can be checked and serviced, if needed. Additionally, increased lubricant volume and/or pressure can be provided in response to such an event alarm. In certain embodiments, plural lubrication start signals can be issued in a series for dispensing the lubricant to the moving component. In such embodiments, the time threshold determination of step 86 can be based on a first lubrication start signal or, alternatively, based on one or more of the plural lubrication start signals (e.g., dispensed lubricant volume threshold based on lubricant volume per start signal).

Returning to step 84, if the momentary increase is detected, the operation proceeds to step 89 to track the progress and confirm proper lubrication of the moving component. According to one embodiment, the dB level is tracked for a drop (or decrease in amplitude)—e.g., to below first threshold 74 (FIG. 6)—immediately after the detected momentary increase to confirm proper initial lubrication. In an exemplary embodiment, a determination is made as to whether such a drop occurred immediately (e.g., within 2 seconds) after the detected increase and, if not, the operation can proceed to step 88 to generate an event alarm (not shown). In one embodiment, the immediate drop (or decrease) is at least 7 dB from a level of the detected immediate increase of step 84.

Once proper initial lubrication is confirmed, progress of the lubrication operation is tracked for completion. For example, the dB level is monitored to ensure a sustained lower operating level for the moving component (e.g., below first threshold 74 for more than about 1-2 seconds to about 5 minutes depending upon one or more of a model, a size, or a structural arrangement of the moving component, structural characteristics of the internal lubricant feed channel of the moving component, to name a few, as well understood by one of ordinary skill in the art) and to complete the lubrication operation before any increase in the dB level due to over-lubrication. In an embodiment, the sustained lower operating level is a decrease of at least 7 dB from an operating level of the moving component before the lubrication operation was initiated.

While the present invention has been particularly shown and described with reference to preferred embodiments thereof; it will be understood by those skilled in the art that various changes in form and details may be made therein without departing from the spirit and scope of the invention, and that the embodiments are merely illustrative of the invention, which is limited only by the appended claims. In particular, the foregoing detailed description illustrates the invention by way of examples and not by way of limitation. The description enables one skilled in the art to make and use the present invention, and describes several embodiments, adaptations, variations, and method of uses of the present invention.

What is claimed is:

1. An apparatus for detecting an initial lubrication of a moving component, comprising:

an ultrasonic sensor that detects an ultrasonic output signal from the moving component;

a lubrication dispenser for providing lubrication to the moving component upon initiation of a lubrication operation; and a processor communicatively coupled to the ultrasonic sensor and comprising a storage, the storage having stored therein instructions that, when executed, cause the processor to:

receive, from the ultrasonic sensor, the ultrasonic output signal detected from the moving component;

identify the initiation of the lubrication operation;

after identifying the initiation of the lubrication operation, monitor the ultrasonic output signal received from the ultrasonic sensor to detect a momentary increase in an amplitude of the ultrasonic output signal above a level that indicates a need for lubrication, and which is indicative of an initial interaction between lubricant and the moving component; and upon detecting the momentary increase in amplitude, track progress of the lubrication operation by detecting a sustained decrease in the amplitude for the ultrasonic output signal received from the ultrasonic sensor and causing said lubrication dispenser to continue the lubrication operation for a period thereafter, wherein the momentary increase in the amplitude is at least a 3 dB (decibel) increase in the ultrasonic output signal within 2 seconds.

2. The apparatus of claim 1, wherein the storage further comprises instructions that, when executed, cause the processor to generate an event alarm when the momentary increase in the amplitude is not detected by the monitoring within a time threshold.

3. The apparatus of claim 2, wherein the time threshold is about 1-2 seconds to about 5 minutes.

4. The apparatus of claim 2, wherein in response to the event alarm the processor causes the lubrication dispenser to cease proving lubricant.

5. The apparatus of claim 2, wherein in response to the event alarm processor causes the lubrication dispenser to increase lubricant volume and/or pressure.

6. The apparatus of claim 1, wherein the storage further comprises instructions that, when executed, cause the processor to confirm the initial interaction between the lubricant and the moving component by detecting for an immediate decrease in the amplitude of the ultrasonic output signal after the detected momentary increase in amplitude.

7. The apparatus of claim 6, wherein the immediate decrease in the amplitude is at least a 7 dB (decibel) decrease within 2 seconds from the detected momentary increase in the amplitude, and an event alarm is generated when the immediate decrease in the amplitude is not detected.

8. The apparatus of claim 1, wherein the sustained decrease is at least a 7 dB (decibel) decrease from a level of the ultrasonic output signal before the initiation of the lubrication operation.

9. A method for detecting an initial lubrication of a moving component, comprising:

receiving, by a processor from an ultrasonic sensor, an ultrasonic output signal detected from the moving component;

initiation of a lubrication operation by causing a lubrication dispenser to provide lubricant to the moving components;

identifying, by the processor, the initiation of the lubrication operation;

after identifying the initiation of the lubrication operation, monitoring, by the processor, the ultrasonic output signal received from the ultrasonic sensor to detect a momentary increase in an amplitude of the ultrasonic output signal above a level that indicates a need for lubrication, and which is indicative of an initial interaction between a lubricant and the moving component; and upon detecting the momentary increase in amplitude, tracking, by the processor, the progress of the lubrication operation by detecting a sustained decrease in the amplitude of the ultrasonic output signal received from the ultrasonic sensor and causing said lubrication dispenser to continue the lubrication operation for a period thereafter, wherein the momentary increase in the amplitude is at least a 3 dB (decibel) increase in the ultrasonic output signal within 2 seconds.

10. The method of claim 9, further comprising generating an event alarm when the momentary increase in the amplitude is not detected by the monitoring within a time threshold.

11. The method of claim 10, wherein the time threshold is about 1-2 seconds to about 5 minutes.

12. The method of claim 10, wherein in response to the event alarm the processor causes the lubrication dispenser to cease proving lubricant.

13. The method of claim 10, wherein in response to the event alarm the processor causes the lubrication dispenser to increase lubricant volume and/or pressure.

14. The method of claim 9, further comprising confirming the initial interaction between the lubricant and the moving component by detecting an immediate decrease in the amplitude of the ultrasonic output signal after the detected momentary increase in amplitude.

15. The method of claim 14, wherein the immediate decrease in the amplitude is at least a 7 dB (decibel) decrease within 2 seconds from the detected momentary increase in the amplitude, and an event alarm is generated when the immediate decrease in the amplitude is not detected.

16. The method of claim 9, wherein the sustained decrease is at least a 7 dB (decibel) decrease from a level of the ultrasonic output signal before the initiation of the lubrication operation.

* * * * *